US007595798B2

(12) United States Patent
Ben-Shachar et al.

(10) Patent No.: US 7,595,798 B2

(45) Date of Patent: Sep. 29, 2009

(54) APPLICATION SHARING USER INTERFACE IMPROVEMENTS

(75) Inventors: Ido M. Ben-Shachar, Sammamish, WA (US); Deana Rae Fuller, Seattle, WA (US); Ivan J. Leichtling, Redmond, WA (US); Robert W. Schmieder, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 596 days.

(21) Appl. No.: 11/187,111

(22) Filed: Jul. 22, 2005

(65) Prior Publication Data

US 2005/0257165 A1 Nov. 17, 2005

Related U.S. Application Data

(62) Division of application No. 10/116,817, filed on Apr. 5, 2002, now Pat. No. 7,028,266.

(51) Int. Cl.
*G06F 17/00* (2006.01)

(52) U.S. Cl. ....................... 345/418; 345/421; 715/750; 715/751

(58) Field of Classification Search ................ 345/418, 345/421

See application file for complete search history.

(56) References Cited

U.S. PATENT DOCUMENTS

| | | | |
|---|---|---|---|
| 4,386,416 | A | 5/1983 | Giltner et al. |
| 4,631,521 | A | 12/1986 | El-Sherbini |
| 4,672,459 | A | 6/1987 | Kudo |
| 4,677,649 | A | 6/1987 | Kunishi et al. |
| 4,783,834 | A | 11/1988 | Anderson et al. |
| 4,814,987 | A | 3/1989 | Miyao et al. |
| 4,823,122 | A | 4/1989 | Mann et al. |
| 4,882,687 | A | 11/1989 | Gordon |
| 4,897,799 | A | 1/1990 | Le Gall et al. |
| 4,965,677 | A | 10/1990 | Pennebaker et al. |
| 4,974,173 | A | 11/1990 | Stefik et al. |
| 5,008,853 | A | 4/1991 | Bly et al. |
| 5,057,916 | A | 10/1991 | Krause et al. |
| 5,077,732 | A | 12/1991 | Fischer et al. |
| RE33,894 | E | 4/1992 | Bradley |
| 5,172,103 | A | 12/1992 | Kita et al. |
| 5,177,622 | A | 1/1993 | Yoshida et al. |

(Continued)

FOREIGN PATENT DOCUMENTS

WO WO 99/26153 5/1999

OTHER PUBLICATIONS

Gutekunst, Thomas et al., "A Distributed and Policy-Free General-Purpose Shared Window System," Oct. 6, 1994, Feb. 1995 IEEE/ACM Transactions on Networking, 13 pages.

(Continued)

*Primary Examiner*—M Good Johnson
(74) *Attorney, Agent, or Firm*—Perkins Coie LLP

(57) ABSTRACT

An improved application sharing system and method are described wherein shared window data is treated according to different sets of rules depending upon the fraction of the shared window data that corresponds to the actual shared window. In this manner, occlusions of a shared window on a sharer display may be disguised or handled by a viewer display to minimize the impact of the occlusion on a viewing user, providing a more consistent and less confusing viewer experience.

20 Claims, 8 Drawing Sheets

U.S. PATENT DOCUMENTS 5,179,711 A 1/1993 Vreeland
5,206,934 A 4/1993 Naef, III
5,210,825 A 5/1993 Kavaler
5,241,625 A 8/1993 Epard et al.
5,241,653 A 8/1993 Collins et al.
5,255,361 A 10/1993 Callaway et al.
5,287,203 A 2/1994 Namizuka
5,298,992 A 3/1994 Pietras et al.
5,319,463 A 6/1994 Hongu et al.
5,390,262 A 2/1995 Pope
5,404,436 A 4/1995 Hamilton
5,408,600 A 4/1995 Garfinkel et al.
5,485,559 A 1/1996 Sakaibara et al.
5,491,780 A 2/1996 Fyles et al.
5,550,968 A 8/1996 Miller et al.
5,565,886 A 10/1996 Gibson
5,608,872 A 3/1997 Schwartz et al.
5,625,809 A 4/1997 Dysart et al.
5,649,104 A 7/1997 Carleton et al.
5,655,152 A 8/1997 Ohnishi et al.
5,673,371 A 9/1997 Koopman et al.
5,699,524 A 12/1997 Ooishi et al.
5,717,856 A 2/1998 Carleton et al.
5,727,155 A 3/1998 Dawson
5,754,873 A 5/1998 Nolan
5,758,110 A 5/1998 Boss et al.
5,760,769 A 6/1998 Petrie
5,781,732 A 7/1998 Adams
5,815,151 A 9/1998 Argiolas et al.
5,826,051 A 10/1998 Porter et al.
5,831,872 A 11/1998 Pan et al.
5,835,713 A 11/1998 FitzPatrick et al.
5,847,706 A 12/1998 Kingsley
5,864,711 A 1/1999 Mairs et al.
5,874,960 A 2/1999 Mairs et al.
5,933,597 A 8/1999 Hogan
5,938,724 A 8/1999 Pommier et al.
5,949,435 A 9/1999 Brock et al.
5,986,655 A 11/1999 Chiu et al.
5,995,096 A 11/1999 Kitahara et al.
6,008,804 A 12/1999 Pommier et al.
6,025,871 A 2/2000 Kantor et al.
6,057,835 A 5/2000 Sato et al.
6,167,433 A 12/2000 Maples et al.
6,173,315 B1 1/2001 Deleeuw
6,191,797 B1 * 2/2001 Politis ........................ 345/440
6,216,177 B1 4/2001 Mairs
6,219,044 B1 4/2001 Ansberry et al.
6,230,171 B1 5/2001 Pacifici
6,275,223 B1 8/2001 Hughes
6,285,363 B1 9/2001 Mairs et al.
6,292,166 B1 9/2001 Palmer et al.
6,304,928 B1 10/2001 Mairs
6,317,777 B1 11/2001 Skarbo et al.
6,329,984 B1 12/2001 Boss et al.
6,342,906 B1 1/2002 Kumar et al.
6,343,316 B1 1/2002 Sakata et al.
6,356,279 B1 * 3/2002 Halstead et al. ............. 345/619
6,380,940 B1 * 4/2002 Halstead et al. .......... 345/469.1
6,456,305 B1 9/2002 Qureshi et al.
6,460,126 B1 10/2002 Spilo et al.
6,469,716 B1 * 10/2002 Carter et al. ................ 715/763
6,570,590 B1 5/2003 Dubrow et al.
6,577,330 B1 6/2003 Tsuda et al.
6,584,466 B1 6/2003 Serbinis et al.
6,584,493 B1 6/2003 Butler
6,654,032 B1 11/2003 Zhu et al.
6,687,878 B1 2/2004 Eintracht et al.
6,697,846 B1 2/2004 Soltis
6,823,514 B1 11/2004 Degenero et al.
6,825,860 B1 11/2004 Hu et al.
6,826,595 B1 11/2004 Barbash et al.
6,833,844 B1 12/2004 Shiota et al.
6,859,928 B2 2/2005 Wright
6,910,188 B2 6/2005 Keohane et al.
6,911,987 B1 6/2005 Mairs
6,973,627 B1 12/2005 Appling
6,982,729 B1 1/2006 Lange et al.
7,003,728 B2 2/2006 Berque
7,046,253 B2 * 5/2006 Long et al. .................. 345/591
7,127,460 B2 10/2006 Nixon et al.
7,356,563 B1 4/2008 Leichtling et al.
7,404,014 B2 7/2008 Mairs et al.
7,414,638 B2 8/2008 Ben-Shachar et al.
2001/0000811 A1 5/2001 May et al.
2002/0010713 A1 1/2002 Egilsson
2002/0065919 A1 5/2002 Taylor et al.
2002/0078088 A1 6/2002 Kuruoglu et al.
2002/0095399 A1 7/2002 Devine et al.
2002/0174181 A1 11/2002 Wei
2002/0184310 A1 12/2002 Traversat et al.
2003/0028610 A1 2/2003 Pearson
2003/0085922 A1 5/2003 Wei
2003/0103088 A1 6/2003 Dresti et al.
2003/0137522 A1 7/2003 Kaasila et al.
2003/0140044 A1 7/2003 Mok et al.
2003/0167339 A1 9/2003 Zhu et al.
2003/0189599 A1 10/2003 Ben-Shachar et al.
2003/0189601 A1 10/2003 Ben-Shachar et al.
2004/0024819 A1 2/2004 Sasaki et al.
2004/0066408 A1 4/2004 Meyers et al.
2004/0260717 A1 12/2004 Albornoz et al.
2005/0024389 A1 2/2005 Mairs et al.
2005/0033817 A1 2/2005 Wei
2005/0055306 A1 3/2005 Miller et al.
2006/0136336 A1 6/2006 Drummond et al.
2006/0136837 A1 6/2006 Ben-Shachar et al.
2006/0288389 A1 12/2006 Deutscher et al.

OTHER PUBLICATIONS

U.S. Appl. No. 10/127,951, filed Apr. 22, 2002, Schmieder et al.
U.S. Appl. No. 10/153,501, filed May 22, 2002, Ben-Shachar et al.
U.S. Appl. No. 11/187,048, filed Jul. 22, 2005, Ben-Shachar et al.
U.S. Appl. No. 10/164,686, filed Jun. 6, 2002, Leichtling et al.
http://www.microsoft.com/windows/netmeeting/.
Screen Dumps of Microsoft Word 2000, Jun. 10, 1999 (8 pages).
U.S. Appl. No. 10/859,640, filed Jun. 3, 2004, Mairs et al.
Schroeder, Erica, "Videoconferencing—Creative brings Mac package to Windows," Networking, PC Week, vol. 11, No. 25, Jun. 27, 1994, pp. 83 & 88.
Intel Corporation, "Intel ProShare Personal Conferencing Software, Getting Started Guide," Intel Corporation, 1994, pp. 25-31.
Schroeder, Erica, "PictureTel Plans Low-Cost Video App Sharing," PC Week, vol. 11, No. 25, Jun. 27, 1994, pp. 1 & 171.
"A Primer on the T.120 Series Standard," DataBeam Corporation, pp. 1-13, 1995.
Hao, Ming C., Alan H. Karp and Daniel Garfinkel, "Collaborative Computing: A Multi-Client Multi-Server Environment," COOCS'95, © 1995 ACM, pp. 206-213.
U.S. Appl. No. 12/194,500, Ben-Shachar et al.

* cited by examiner

APPLICATION SHARING USER INTERFACE IMPROVEMENTS

CROSS-REFERENCE TO RELATED APPLICATIONS

This application is a divisional of U.S. patent application Ser. No. 10/116,817 entitled "APPLICATION SHARING USER INTERFACE IMPROVEMENTS," filed on Apr. 5, 2002, which application is hereby incorporated by reference in its entirety.

TECHNICAL FIELD

This invention relates generally to the technology of application sharing and, more particularly, relates to a system and method for improving a viewer's experience during application sharing.

BACKGROUND OF THE INVENTION

As computers and computer networks become more pervasive in the home and workplace, many old methods for performing everyday tasks are being replaced or streamlined through the use of computer networking technology. For example, many employees are now able to have a virtual presence in their workplace by logging into a computer network maintained by their employer. One of the most striking developments in computer networking technology has been the advent of remote collaboration.

One of the oldest forms of processing data is the meeting or conference, whereby multiple individuals focus their attention on common subject matter to arrive at a joint decision, consensus, or product. Increasingly, such meetings are now taking place virtually over computer networks through the use of application sharing technologies. Such technologies enable a sharing user to share an application with various viewing users. The display produced by the application running on the sharer's computer is made available via a computer network to the viewers' computers. In some cases, the sharer may pass control of the application to a viewer, whereby the viewer's control inputs are then communicated back to the sharer's computer, where the actions associated with the inputs are executed, and the resulting changed display is shared back out to the viewers.

Although application sharing can play a critical role in maintaining or increasing productivity and cooperation, certain problems with current application sharing systems sometimes create a confusing user experience. For example, a sharing user may simultaneously have on their screen a shared window and an unshared window. In an ideal case, a viewing party, or viewer, sees on their computer display and image of the shared window in whole, and does not see the unshared window or any artifacts caused thereby. However, if the sharing user moves the unshared window in such a way as to partially or wholly occlude the shared window, then the viewing user can no longer see the occluded portion. Furthermore, since the unshared window cannot be shown, the occluded region is often filled in with hash marks or other placeholder imagery. The same situation may occur when an unshared window is generated automatically, such as when a message notification or system window is generated.

The screen presentation at the viewer's machine in such a situation is often unpleasant to the viewer, and indeed may be quite confusing and discomfiting to the novice user. A system and method are needed whereby the viewer experience of application sharing during periods of whole or partial occlusion is improved over prior systems.

SUMMARY OF THE INVENTION

A novel system and method are described for providing a simple and pleasing viewer experience during application sharing when a shared window is occluded in whole or in part by an unshared window. When an unshared window becomes situated in such a manner as to occlude some or all of a shared window during application sharing, the occluded portion is generated from a prior view taken at a time when the portion in question was not obscured. If the percentage of the shared window that is obscured rises above a threshold value, then the entire shared window view is generated from a prior view, and the viewer is informed in an embodiment of the invention that the sharer has paused the sharing session. In an embodiment, a predetermined amount of time is allowed to transpire in such a situation before the viewer is informed that the sharer has paused the sharing session. In this way, large but temporary occlusions are not conveyed to the viewer, and the predetermined delay is short enough that a noticeable delay in sharing is not created in the viewer's perception.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
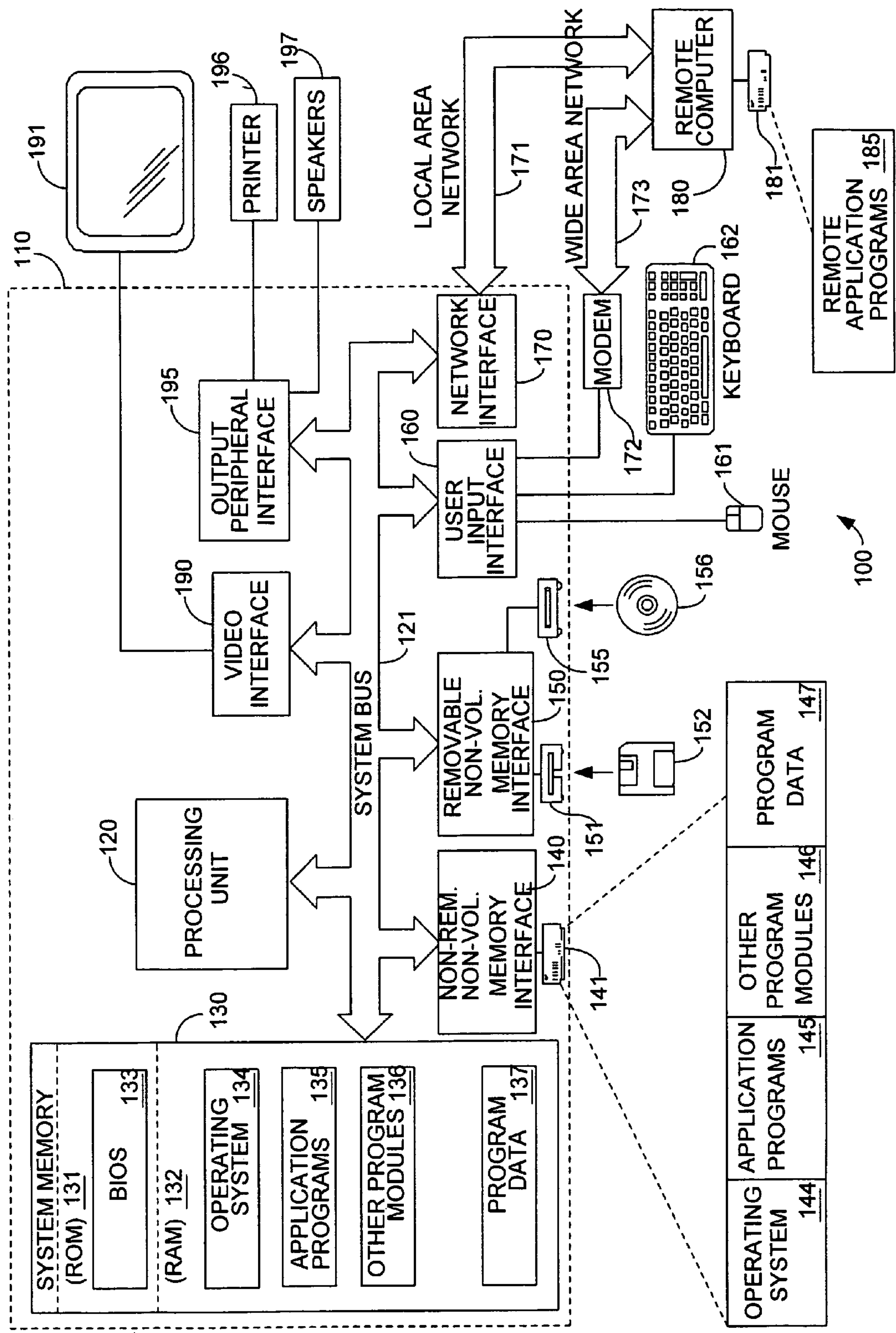
FIG. 1 is a block diagram generally illustrating an exemplary computer system usable in an implementation of an embodiment of the invention.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention is primarily for use in a networked environment and may further be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 usable in an implementation of the invention. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that are suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

An exemplary system for implementing the invention includes a general-purpose computing device in the form of a computer 110. Components of the computer 110 generally include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example only, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics (such as, for example, voltage or current level, voltage or current pulse existence or nonexistence, voltage or current pulse width, voltage or current pulse spacing, etc.) set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates RAM 132 as containing operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162, pointing device 161 (commonly referred to as a mouse), and trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

In the implementation of an embodiment of the invention, the computer 110 operates in a networked environment using logical connections to one or more remote computers, such as a remote computer 180. The remote computer 180 may be a personal computer, a router, a network PC, a peer device or other common network node, and in any case the remote computer or computers typically include many or all of the elements described above relative to the personal computer 110, although only a memory storage device 181 has been illustrated in FIG. 1. The logical connections depicted in FIG. 1 include a local area network (LAN) 171 and a wide area network (WAN) 173, but the computer 110 may additionally or alternatively use one or more other networking environments. Networking environments of all types are commonplace in offices, enterprise-wide computer networks, intranets and the Internet.

The computer 110 should include facilities for accessing the networks to which it is attachable. For example, when used in a LAN networking environment, the personal computer 110 is connected to the LAN 171 through a network interface or adapter 170. Another node on the LAN, such as a proxy server, may be further connected to a WAN such as the Internet. When used in a WAN networking environment, the computer 110 typically includes a modem 172 or other means for establishing communications directly or indirectly over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used. It is not intended to limit the invention to use in a hard-wired network environment, since it may also be used in transiently connected environments, such as for example a wholly or partially wireless network environment interconnected wholly or partially via optical, infrared, and/or radio frequency wireless connections.

Herein, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
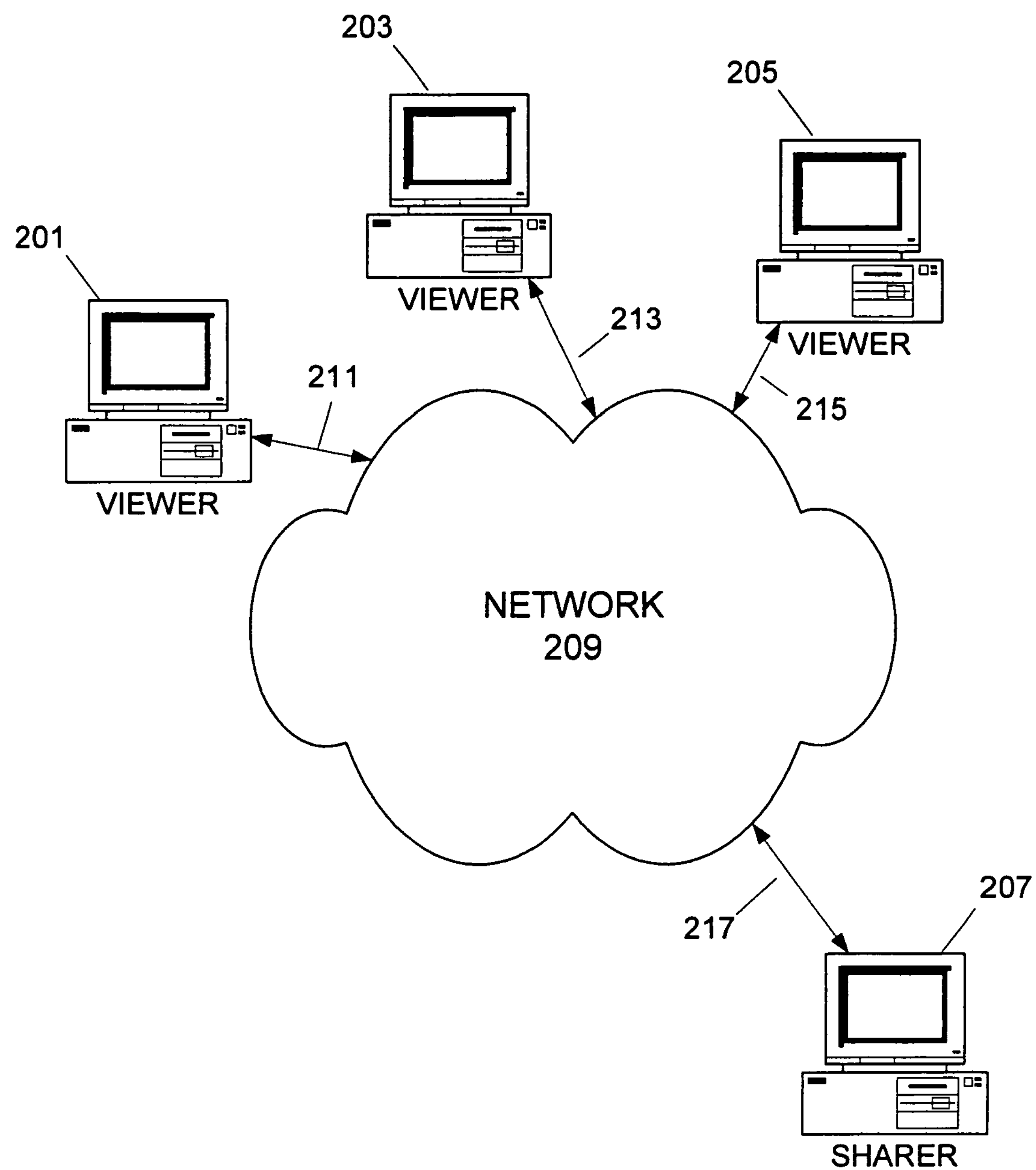
FIG. 2 is a schematic diagram showing the architecture of a network system within which an embodiment of the invention may be implemented, including multiple computers comprising a sharer computer and viewer computers.

FIG. 2 illustrates schematically a networking environment in which the present invention in preferably implemented. The architecture of such a system comprises one or more viewer computers illustrated as computers 201, 203, and 205, connected to a sharer computer 207 via a network 209. Each computer 201, 203, 205, 207 is connected or connectable to the network 209 and hence to the others of computers 201, 203, 205, 207 via network connections 211, 213, 215, and 217. The network connections 211, 213, 215, 217 and computers 201, 203, 205, 207 are as discussed above more generally with respect to FIG. 1. The network may be of any type, including, for example, a LAN, such as found in an office, university or other setting, a WAN such as the Internet, a MAN, or any other tangible or intangible, fixed or transient mechanism for computer interconnectivity. While higher data transfer rates are generally preferable to lower data transfer rates, there is no limit or requirement as to the speed of the network 209. In addition, the network 209 may be a single network, or alternatively may be comprised of multiple networks of the same or different types and/or speeds. It will be understood that in many but not all cases, the network will further comprise routers, servers, and/or other computing devices in addition to the endpoint devices 201, 203, 205, 207 involved in the collaborative effort.

Figure 3:
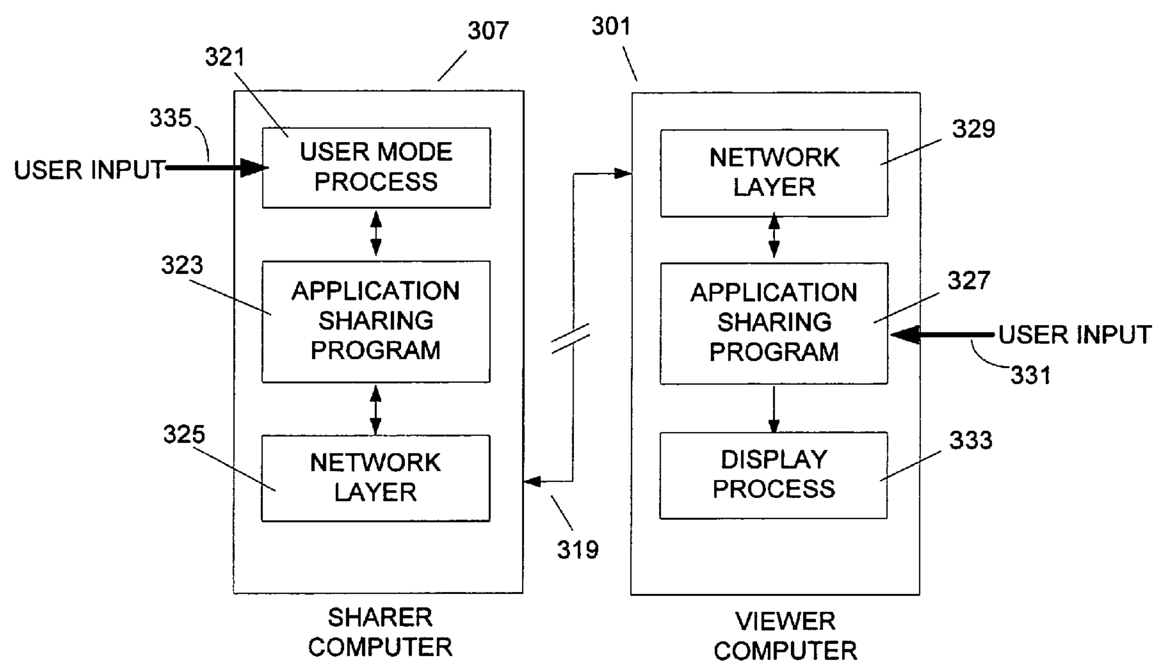
FIG. 3 is a schematic diagram illustrating in greater detail the placement and function of an application sharing program in an embodiment of the invention with respect to a sharer computer and a viewer computer.

Specific exemplary architectures of the sharer computer 207 and a viewer computer 201 are illustrated in greater detail schematically in FIG. 3. It will be understood that although only one viewer computer is illustrated in FIG. 3, there can be more than one such computer in an implementation of the invention, as illustrated by way of FIG. 2. Sharer computer 307 is illustrated as being connected via networking connection 319 to viewer computer 301. As will be appreciated by those of skill in the art, network connection 319 can include some or all of the network types and network connections discussed above, as well as other network types and connections alternatively or additionally.

One or more user mode processes of interest 321 are running on sharer computer 307. Such processes include processes, such as a programs, from which information is being shared to one or more viewers such as viewer 307. The processes of interest 321 will be referred to hereinafter as shared processes, with the understanding that the information generated by the processes 321 need not be shared completely. That is, the information shared may consist of a subset of the information generated by such a process 321. Many shared process can also be used in a non-shared manner. For example, a word processing program may be used by the sharer for non-collaborative document production, and may then be used in a shared manner for group editing of the same or another document. In either mode, the processes 321 and the operating system of the sharer computer 307 perform certain steps. For example, whether or not the process 321 is shared, the output of the process 321 will still generally be output to the graphics display driver of the sharer computer 307.

If the application sharing program 323 is active, such as during a sharing session, then other processes unique to the collaborative setting also take place. In particular, the application sharing program 323, which is communicably linked to the process 321, receives information from the process 321 and transfers information to the process 321. Although the bi-directional flow of information between the process 321 and application sharing program is illustrated by a double arrow, note that the mechanisms for transfer may vary depending upon direction. For example, the process 321 need not even be aware of the presence or operation of the application sharing program 323 for the application sharing program 323 to receive information from the process 321.

Typically, the application sharing program 323 is communicably linked to an interceptor filter placed in the display path for the process 321. Such a filter may be placed just before the graphics device interface (GDI) or similar interface in such a manner as to read, in a non-intrusive manner, all information sent to the screen of computer 307 by a shared process. In the WINDOWS operating system produced by MICROSOFT of Redmond, Wash., when an application wants to display an object, it calls a GDI function and sends the various parameters for the object. In turn, the GDI sends commands to the screen to cause it to actually paint the object. In contrast, the mechanism for transferring information from the application sharing program 323 to the process 321 need not involve the display path at all, and may instead involve a direct transfer of information.

Regardless, the application sharing program 323 is also communicably linked to the networking facilities 325 of the sharer computer 307. Such facilities 325 may include any networking communications stack or other protocol arrangement as well as the hardware required for accessing the network connection 319, as discussed above with respect to FIG. 1. Across the network connection 319, a counterpart application sharing program 327 running on the viewer computer 307 is communicably linked to the sharer computer 307 via the network connection 319 and the networking facilities 329 of the viewer computer. The networking facilities 329 may be similar to the networking facilities 325 of the sharer computer. The counterpart application sharing program 327 receives input from shared process 321 via the network connection 319 and also potentially from a user of the viewer computer 301, via one or more input channels 331, such as a keyboard, mouse, etc. as discussed above with respect to FIG. 1. Additionally, the counterpart application sharing program 327 outputs material for display to a display process 333 such as a GDI or similar interface, or other display process. Note that the sharing computer also preferably includes input channels 335 such as those described above for receiving user input, some of which may be directed to and received by the process of interest 321.

The general operation of the architecture and components illustrated in FIG. 3 will be described briefly in overview before giving a detailed exposition of the processes involved in embodiments of the invention. Initially the shared process 321 is running on sharer machine 307, and is processing one or more documents or files. The user of the sharer machine 307 can begin execution of the application sharing program 323 by selecting an icon on the display screen of machine 307 or otherwise. Preferably, upon prompting by the user either via start-up of the application sharing program 321 or by selection of an option during execution of the application sharing program 321, the user of sharer machine 307 is presented with a list of all sharable documents currently open on machine 307, including those being processed by process 321. The user may select documents to be shared as well as a viewer with whom the documents will be shared.

The application sharing program 327 resident on the viewer machine 329 should be running before sharing of documents occurs, and may be run in the same manner as described above. At this point, document sharing may occur. That is, of all the documents selected as shared by the user of sharer machine 307, data corresponding to all or some shared windows is transmitted to the viewer computer 301 for display on the screen or display device of that computer 301 in an embodiment of the invention.

Figure 4A:
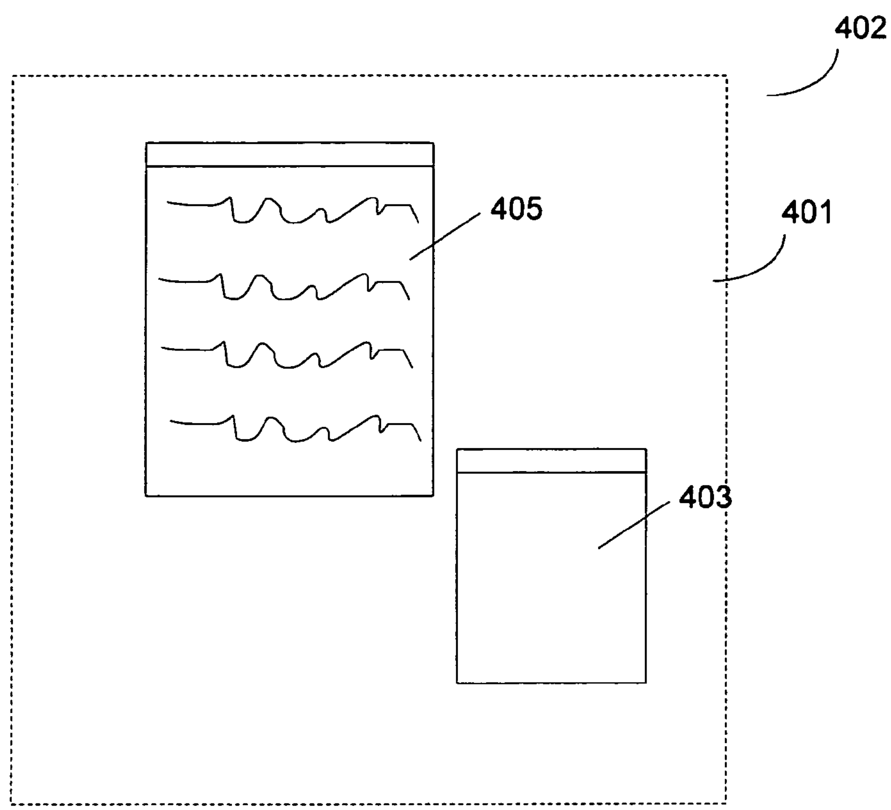
FIG. 4A is a simplified sharer screen representation showing a sharer display of a shared window without occlusion by an unshared window.

FIG. 4 illustrates two separate views 402, 404 of a sharer display 401 taken at different points in time. In the first view 402, two separate windows 403, 405 appear in their entireties on the sharer display. In this example, one window 405 is shared while the other 403 is unshared. That is, a viewer machine communicably connected to the sharer machine and participating in a sharing session will not display the unshared window 403.

In the second view 404, the unshared window 403 has been moved so that it is positioned in such a way as to partially occlude shared window 405. It will be appreciated that content in a shared window may be obscured in any number of other ways. For example, using the WINDOWS brand operating system produced by MICROSOFT of Redmond, Wash., a user may strike a key combination to display a system window. For instance, when a user enters the key combination <alt><tab> simultaneously, a system window is generated and sent to the display, showing open windows that the user may wish to shift to. Such a window typically appears at the center of the display. Similarly, other windows may be created in a position that obscures the shared window, rather than being moved into position. For example, many notification windows notifying a user that he or she has mail, that a print job has completed, and so forth, are created in a prominent position on the display in front of whatever material was previously displayed there. Many such windows are short-lived, since they are typically not windows in which a user may stay and work or otherwise manipulate data.

Figure 4B:
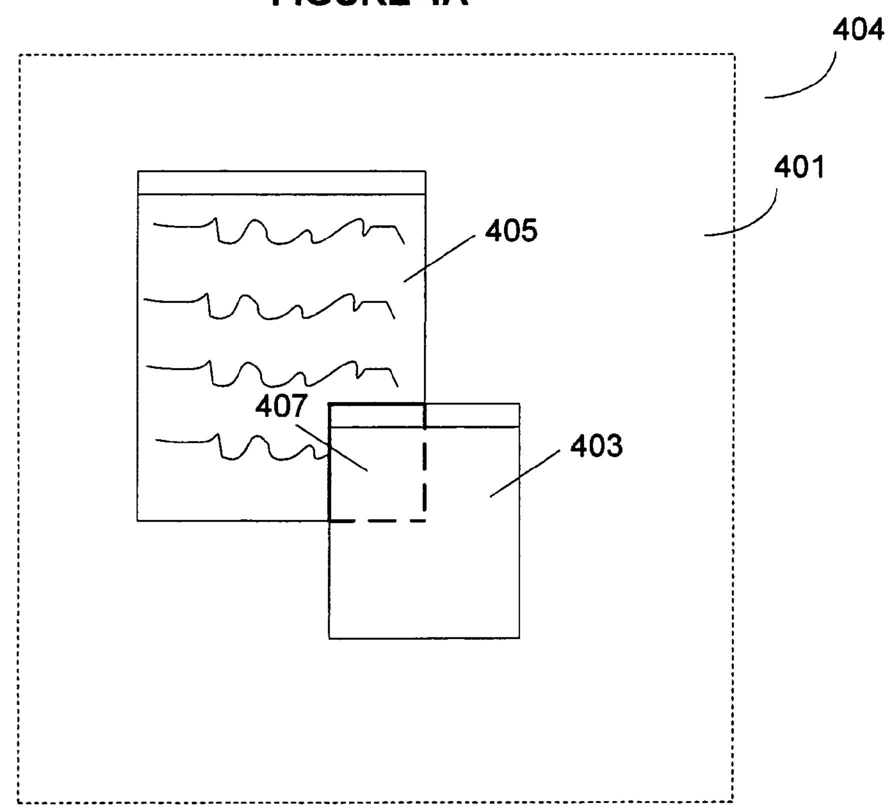
FIG. 4B is a simplified sharer screen representation showing a sharer display of a shared window during partial occlusion by an unshared window.

When a shared window is obscured, as is the case with window 405 in FIG. 4B, a section such as section 407 of the shared window becomes hidden on the sharer's display. Since the hidden portion is no longer painted on the display by the display processing system, there are no longer any paint commands regarding that region to be intercepted and shared with the viewer, even though the viewer is authorized to see such a region since it is part of a shared document. In particular, many operating systems never paint obscured information. For example, The Win32 painting model is that an obscured screen portion simply does not paint, and thus does not produce any GDI painting commands. Thus, for application sharing systems such as NETMEETING by MICROSOFT that intercept GDI paint commands, or similar commands or instructions, to recreate a display for an application sharing viewer, there is no longer any convenient way to know what lies in an obscured region.

Figure 5A:
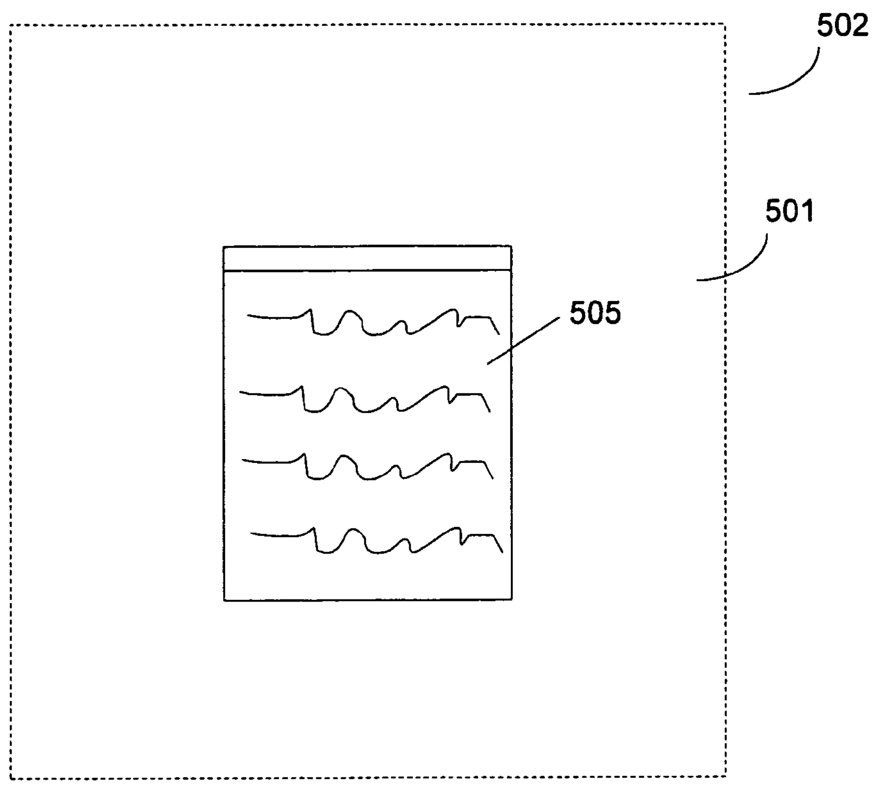
FIG. 5A is a simplified viewer screen representation showing a viewer display of a shared window without occlusion by an unshared window.

FIG. 5 shows the viewer experience in prior application sharing systems in the situation where a shared window is obscured. In particular, the first display view 502 shows the viewer display at a time when the shared window 505, corresponding to window 405, is not obscured on the sharer's display. This corresponds to the case illustrated in view 402 of FIG. 4A. As can be seen, the shared window 405 is in full view as window 505, while the unshared window 403 does not appear at all, since it is by definition not to be shared.

Figure 5B:
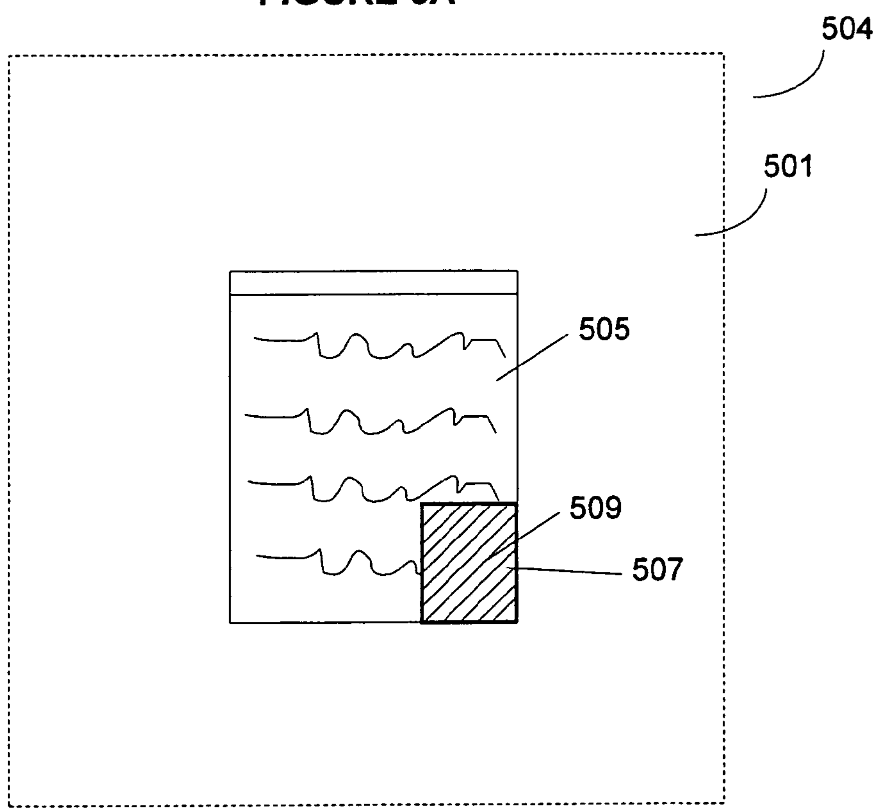
FIG. 5B is a simplified viewer screen representation showing a viewer display of a shared window during partial occlusion by an unshared window according to a prior application sharing occlusion-handling scheme.

Display view 504 of FIG. 5B illustrates the prior viewer experience when an unshared window such as window 403 is positioned in front of the shared window 405 on the sharer's display. In particular, the viewer display shows the unobscured portions of the shared window 505, while filling the area 507 corresponding to the obscured portion with a placekeeper such as hash marks 509. This type of solution may disorient and confuse novice or infrequent users of the application sharing technology.

Figure 6:
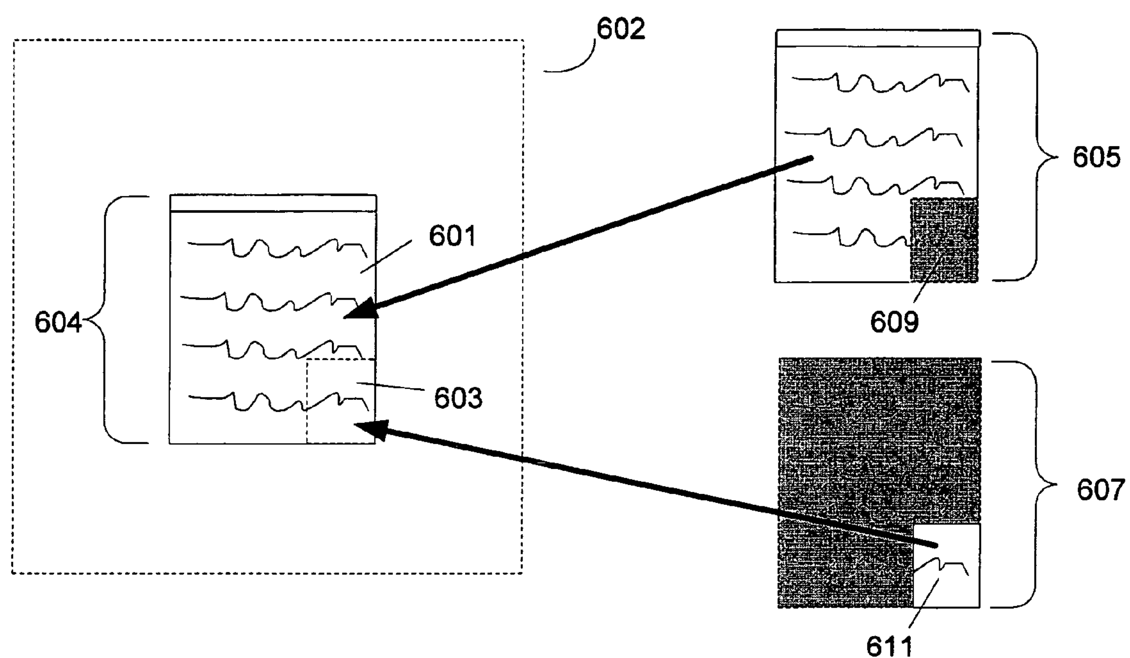
FIG. 6 is a display representation with schematic diagram of memory maps showing a viewer display of a shared window during partial occlusion by an unshared window in an embodiment of the invention, and a mechanism for disguising a small partial occlusion to the viewer during application sharing in an embodiment of the invention.
Figure 7:
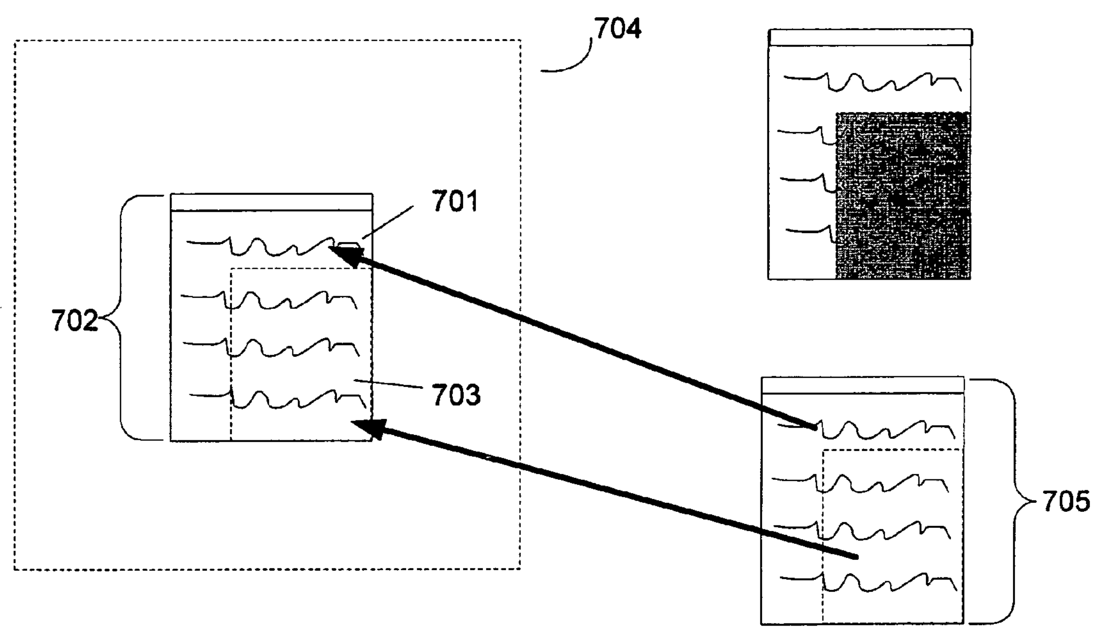
FIG. 7 is a display representation with schematic diagram of memory maps showing a viewer display of a shared window during total or partial occlusion by an unshared window in an embodiment of the invention, and a mechanism for disguising a large occlusion to the viewer during application sharing in an embodiment of the invention.

FIGS. 6 and 7 illustrate techniques for constructing viewer display representations for presenting a region of a shared window corresponding to a region that has been obscured on the sharer display, according to embodiments of the invention. These figures will be discussed below to give an overview according to embodiments of the invention after which the process of display construction will be discussed in greater detail with respect to FIG. 8.

FIG. 6 illustrates a technique for reconstructing a viewer display when a small portion of a shared window, such as less than about 30% of the window's original area, has become obscured. The shared window representation 604 on viewer display 602 does not contain any apparently obscured regions although the shared window has been partially obscured to a small degree in the sharer region corresponding to reconstructed viewer region 603. An obscuring event may be as illustrated in display 404 of FIG. 4B or otherwise. As can be seen from FIG. 6, the viewer display 602 of the shared window contains shared data in all regions of the window regardless of the obscuring event at the sharer display.

Memory maps 605 and 607 illustrate the manner in which the viewer display is constructed after a small partial obscuring of a shared window. Maps 605 and 607 may be bitmaps stored in the memory of the viewer computer hosting the viewer display. Map 605 corresponds to the current shared data corresponding to the current sharer view of the shared window. It can be seen that map 605 is not a complete picture of the shared window, but rather contains an obscured region 609 for which no shared data is sent to the viewer computer, due to the obscuring event. In contrast, map 607 corresponds to a partial prior set of shared data associated with the shared window before the obscuring event, and gives a complete picture of the obscured region or any newly obscured region at that prior point in time. Thus, map 605 provides an incomplete but current view of the shared window, while map 607 provides outdated information to complete the viewer display of the shared window.

To construct the viewer display of the shared window after the obscuring event, different parts of each map 605,607 are combined to yield a seemingly complete view. In particular, since the portion of current map 605 outside of obscured region 609 is current, this portion is used to construct the unobscured region of the viewer display, i.e. region 601. However, since the current map 605 does not contain data corresponding to the obscured region 609, it cannot supply any such data for reconstructing the corresponding region 603 of the viewer display. Therefore, data for this region 603 is gleaned from the corresponding region 611 of the prior map 607.

Although potential complexities arise by virtue of this approach, they are unlikely, and are somewhat mitigated by the bifurcated nature of the system as will be explained by reference to FIG. 7 below. For example, since the reconstructed region 603 of the view display is not current data, there is a possibility that the current data in the regions outside of region 603, such as region 601, will become noticeably inconsistent with the data in the reconstructed region 603. This could happen when the sharer scrolls the contents of a partially obscured window where the obscured area is relatively small. In such a case, the viewer will see region 603 remaining static while all other portions of the shared window view scroll.

It has been empirically observed that the possibility of viewer disruption presented by the technique described above with respect to FIG. 6 is relatively minor. This is because, in general, obscuring events that affect less than 30% of the shared window's original area are caused by the presentation on the sharer display of short-lived windows such as system windows or notification windows. Therefore, the obscured condition will often not persist long enough for bothersome inconsistencies to develop in the viewer display.

It has been observed that larger obscuring events, such as those that affect more than about 30% of the shared window's original area, are often associated with more long-lived windows, and as such the technique illustrated via FIG. 6 is not optimally suited for reconstructing the viewer display in such cases. In particular, the larger the portion of the viewer display of the shared window that is reconstructed from outdated information, the more noticeable it will become to the viewer that they are not seeing a current view of the shared window. Furthermore, the longer the obscuring condition remains in effect, the more likely it will become that the viewer will notice and be disturbed or distracted by inconsistencies in the viewer display of the shared window. However, note that in a preferred embodiment of the invention, the duration of a small obscuring event is not a factor in deciding how to treat that event. That is, long-lived small obscuring events and short-lived small obscuring events are both treated the same in a preferred embodiment, although such is not required.

For the above reasons, a different technique for constructing the viewer display of the shared window is used when the obscured portion of the shared window exceeds 30% of the window's original unobscured area, in accordance with an embodiment of the invention. The threshold value of 30% for switching reconstruction modes has been determined to work well, although other thresholds less than or greater than 30% are also within the scope of the invention. For example, a threshold of 10%, 20%, 40%, 50%, 60%, 70%, 80%, or 90% may be used, or any other value that allows a distinction to be made between at least two classes of obscuring events so that such classes may be treated using different techniques. Note that it is also not critical that the same threshold value be used for every type of shared window, but rather the invention also includes the use of a variable threshold adapted to account for application type, sharer display size, or any other consideration.

With reference to FIG. 7, a reconstruction technique usable in the event of a relatively large obscuring phenomenon according to this embodiment is illustrated. The viewer display 704 presents a representation of a shared window to the viewing user. This discussion assumes that the shared window has been obscured on the sharer display in the region corresponding to region 703 on the viewer display, and the extent of obscuring is substantial, such as, for example, greater than 30% or other threshold value as discussed above.

In this case, using outdated information from prior displays to fill in the obscured region may result in discomfort or confusion for the viewer due to the extent to which the shared window is obscured and hence outdated. Rather, in this embodiment, the entire shared window representation on the viewer machine is reconstructed using prior display data 705 taken before the occlusion occurred. Thus, all of the shared window representation 702 corresponds to outdated information. To prevent a viewer from coming to the conclusion that the displayed representation of the shared window corresponds to the actual current contents of the shared window, it is desirable in an embodiment of the invention to present a message on the viewer display 704, informing the viewer that the sharing session has been paused by the sharer. In addition, the content of the viewer representation of the shared window may be "washed out" or otherwise modified to indicate a disabled or invalid condition.

Although the aforementioned technique is based on the observation that phenomena that obscure large portions of a shared window tend to be long-lived, there are situations where a large obscuration occurs for a brief period of time. For example, a sharing user may briefly activate an unshared window in order to copy data, and then switch back to the shared window to paste the data therein. In such situations, it has been observed that it is preferable to freeze the viewer representation of a shared window without presenting a message that the sharing session has been paused, since the obscuring condition soon passes.

Since there may be no technique for determining in every case beforehand how long a particular obscuring event may last, it is desirable to wait a predetermined amount of time once a large obscuring occurs before presenting the viewer with the message that the viewing session has been paused, and/or washing out the viewer display of the shared window. One reason to use this technique is that since the viewing user cannot see the sharing user, the viewing user cannot tell the difference between an image that is slightly out-of-date and an updated image wherein the sharing user has not made any changes to the shared material. It has been determined that an interval of 5 seconds provides good results in this capacity, however any other amount of delay may be used without departing from the scope of the invention.

Figure 8:
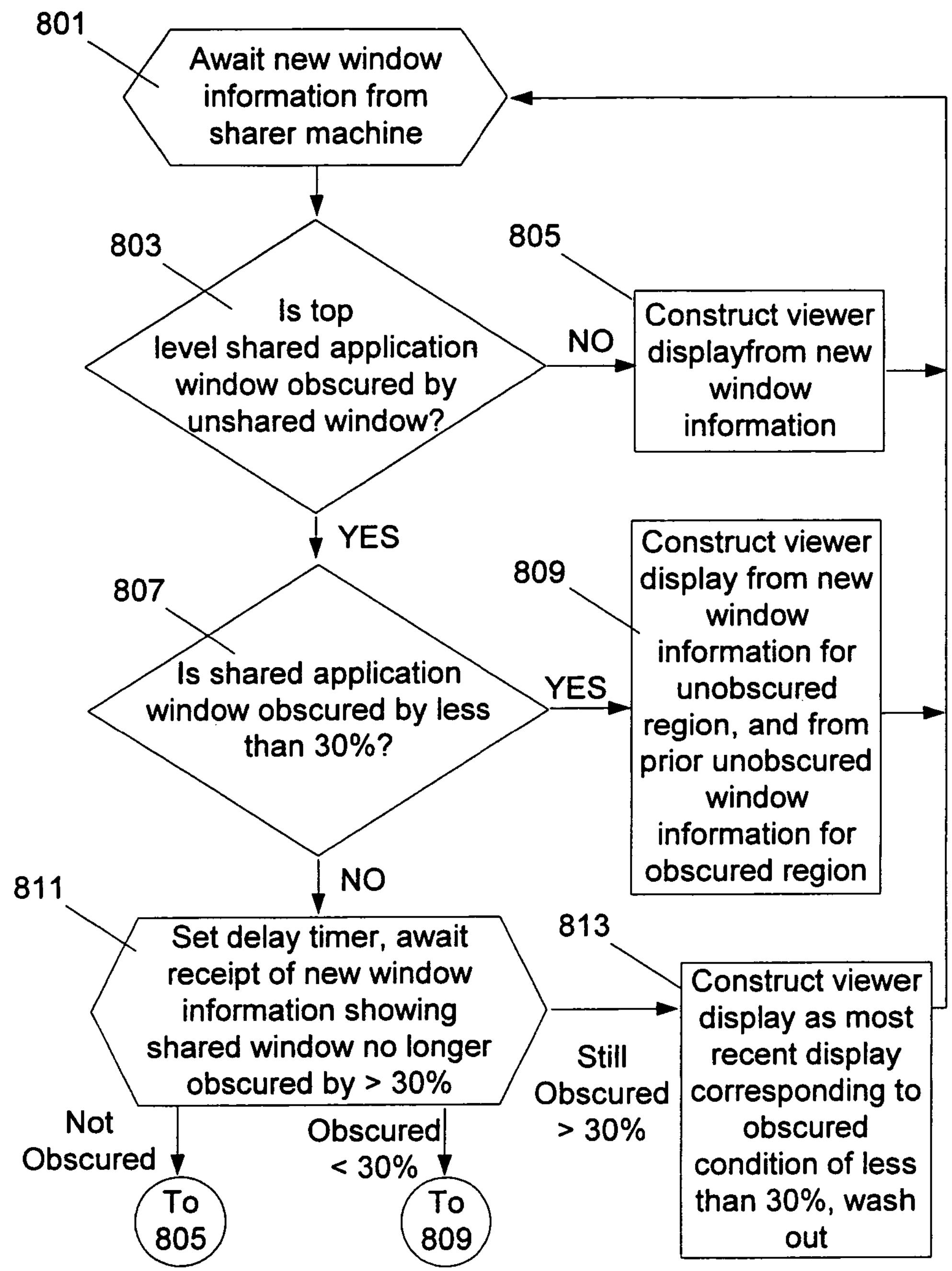
FIG. 8 is a flow chart illustrating a process for preparing a viewer display of a shared window to account for a large or small occlusion of the shared window by an unshared window according to an embodiment of the invention.

The flow chart of FIG. 8 illustrates a process used in an embodiment of the invention to reconstruct the viewer display of a shared window during application sharing. Initially at node 801, the application sharing process running on the viewer machine awaits new window information from the application sharing process running on the sharer machine. That is, it awaits the arrival of a window list and order packet. When new window data is received, the process transitions to decision 803, where it analyzes the received window data to determine whether a top level shared application window is obscured to any degree by an unshared application window. If it is determined at step 803 that no unshared application window obscures a top level shared application window, then the process flows to step 805. At step 805, the process constructs the viewer display of the shared window using the new window information and returns to step 801 to await further window information.

If at step 803 it is instead determined that a top level shared application window is obscured to some degree by an unshared application window, then the process continues to step 807, where it is determined whether the amount of the shared application window that is obscured is less than 30% of the original area of the shared application window. Preferably, the degree to which the area of the shared application window is obscured is evaluated in view of the cumulative affects of all obscuring phenomena. That is, an obscuring of 30% or more may occur as a result of separate obscuring events each of which obscures less than 30% of the original area of the shared application window.

If it is determined at step 807 that the amount of the shared application window that is obscured is less than 30% of the original area of the shared application window, the process flows to step 809, whereat the new display information for the viewer display of the unobscured portion of the shared window is taken from the newly received window information while for the obscured portion of the shared window, the data for painting the corresponding window region on the viewer display is taken from the last prior display data set for painting the shared window on the viewer display wherein that portion of the shared window was not obscured. Once the new display information for the viewer display is created, the process returns to step 801 to await further new window information.

If at step 807 it is determined that the amount of the shared application window that is obscured is greater than 30% of the original area of the shared application window, the process flows to step 811. At step 811, the process sets a five-second timer and awaits the receipt of new window information showing the shared window to no longer be obscured by greater than 30%. During the five-second delay, the viewer display is constructed according to the most recent viewer display corresponding to an obscured condition of less than 30% rather than the new window data. If the five-second timer expires without the receipt of such window information, then the process flows to step 813, whereat the process washes out the current apparently unobscured viewer display, so that the information therein appears as readable but not currently active. The process also preferably places a notification on the screen, such as in a pop-up window, to inform the viewer that the sharing session has been paused. Washing out may be accomplished by using AlphaBlending functionality as in the WINDOWS operating system produced by MICROSOFT of Redmond, Wash. From step 813, the process returns to step 801 to await new window information. Note that on subsequent re-execution of the logically following steps while the occlusion still exceeds 30%, certain steps are treated differently as appropriate. In particular, since the predetermined delay time has expired already, and the display has been modified accordingly already, if the determination at step 807 is a negative, the process returns to step 801 rather than proceeding to step 811.

If instead at step 811, when the five-second timer expires, the most recently received window information indicates that the shared window is stilled obscured, but by less than 30%, then the process flows to step 809 and the steps that logically follow. If at step 811 the most recently received window information when the five-second timer expires indicates that the shared window is no longer obscured, the process returns to step 805 and to execute the steps that logically follow.

With respect to the treatment of window information for purposes of creating the viewer display of a shared window, the following implementation detail variations may be employed, especially if the application sharing session is supported by the WINDOWS operating system. The application sharing program at the viewer machine maintains an off-screen bitmap matched to the sharer's application regions. The application sharing program at the sharer machine sends the application sharing program at the viewer machine a DT_WNDLST packet any time windows are moved or created on the sharer display. The DT_WNDLST packet contains a list of all shared windows and non-shared windows that intersect shared windows on the sharer machine. The list includes information as to the position and shape of each window, as well as an indication of whether the window is shared or not, and the intersections are z-order processed. For example, the lowest z-order window, if shared, is added to the shared region, after which an overlapping non-shared window next in the list may clip the shared region and augment the obscured region. Next, if the following window is shared, it will similarly be used to clip the obscured region and augment the shared region, and so on. The process proceeds in this manner through all windows in the windows list in reverse z-order.

The application sharing program at the viewer machine calculates an obscured region with respect to a displayed shared window from the received data as described above when each new window list arrives. Subsequently, the application sharing program at the viewer machine subtracts from this calculated obscured region for the window any previously calculated obscured region, yielding the newly obscured region over the previous windows information. The newly obscured region is copied to a "paused" bitmap at the viewer for future use in reconstructing the obscured areas of the window. When the viewer subsequently paints the shared window, it utilizes both the off screen bitmap and the paused bitmap, where appropriate in view of the procedure outlined with reference to FIG. 8, e.g. for minor occlusions.

All of the references cited herein, including patents, patent applications, and publications, are hereby incorporated in their entireties by reference. That is, each and every part of every such reference is considered to be part of this disclosure, and therefore no part of any such reference is excluded by this statement or by any other statement in this disclosure from being a part of this disclosure.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Furthermore, although network connections are illustrated herein as lines, no limitation should thereby be imparted to the invention. Network connections may be circuit-switched, packet-switched, or otherwise, and may be transient or permanent, hard-wired or wireless, operating via any suitable protocol. Also note that although embodiments of the invention have been described largely by reference to a sharing program that is separate from the shared process, the sharing program may not be a stand alone program, but may instead be an integral part of the shared process itself, or may be a DLL or other in-process entity.

Moreover, the exact values of the various time periods and percentages given in the above description are exemplary only, and may be varied without departing from the scope of the invention. Thus, a predetermined delay time usable in the process of FIG. 8 may be two seconds, ten seconds, or any other period, and is not restricted to the period of five seconds used as an example. Furthermore, the dividing line between large and small occlusions should be set to give the best results for a given situation. As such, no limitation is intended in this regard, other than that a mechanism for defining classes of occlusions be provided. Although the foregoing description discusses a bifurcated treatment of classes of occlusions, the number of occlusion classes is not limited to two classes, but may include as many classes as are convenient in each particular implementation. It will understood that although the examples of FIGS. 3, 6, 7, and 8 refer to a sharer and a viewer computer, any number of viewers may be involved, and a viewer may become a sharer and a sharer may become a viewer without limitation. In addition, although the foregoing description gives a number of examples wherein one or more windows obscure another window, no limitation to windows is intended. That is, other types of graphical display objects may obscure and may be obscured, and many of the techniques described herein will be appreciated by those of skill in the art to be applicable to such other objects. Such other graphical objects include but are not limited to non-rectilinear objects such as animated objects rendered on the sharer display.

Furthermore, references herein to application sharing are not meant to require that all windows or material displayed on a sharer display and associated with a particular application are shared or unshared. Rather, one or more windows associated with an application running on the sharer machine are preferably sharable without requiring the sharing of all windows associated with that instance of that application. Moreover, although the steps employed to construct the viewer display of an occluded shared window are discussed herein with reference to the application sharing program of the viewer computer, such steps may alternatively be executed in whole or in part at the sharer computer.

Therefore, the invention as described herein contemplates all such embodiments as may come within the scope of the following claims and equivalents thereof.

We claim:

1. A method of displaying shared data of an application sharing session on a local computing device, wherein the data is received from a remote computing device, the method comprising:

analyzing at the local computing device a first quantity of received data corresponding to a graphical object in a memory of the remote computing device;

determining whether the first quantity of received data corresponds to an entirety of the graphical object;

if the first quantity of received data corresponds to less than the entirety of the graphical object, treating the received data according to a first set of data processing rules; and if the first quantity of received data corresponds to the entirety of the graphical object, treating the received data according to a second set of data processing rules.

2. The method according to claim 1, wherein the first set of data processing rules comprises instructions for:

determining whether the first quantity of received data corresponds to less than a predetermined fraction of the graphical object; and constructing an image to be displayed on a display device associated with the local computing device, wherein the image is constructed from data comprising the first quantity of received data when the first quantity of received data does not correspond to less than the predetermined fraction of the graphical object, and wherein the image is constructed from data comprising a second quantity of received data that is received prior to receipt of the first quantity of received data when the first quantity of received data corresponds to less than the predetermined fraction of the graphical object.

3. The method of claim 2 wherein the predetermined fraction is approximately seven-tenths.

4. The method of claim 2 wherein the first set of data processing rules include instructions comprising:

after receiving the second quantity of data, setting a timer to expire after an amount of time; and receiving the first quantity of data.

5. The method of claim 4 wherein the first quantity of data corresponds to a current state of the shared data and the second quantity of data corresponds to a prior state of the shared data.

6. The method of claim 2 wherein when the first quantity of received data does not correspond to less than the predetermined fraction of the graphical object, the constructing includes employing a portion of the second quantity of received data that corresponds to the portion of the graphical object that is not described by the first quantity of received data.

7. The method of claim 2 wherein when the first quantity of received data corresponds to less than the predetermined fraction of the graphical object, the constructing does not employ any portion of the first quantity of received data.

8. The method of claim 7 wherein the constructing employs only the second quantity of received data.

9. The method of claim 8 wherein the constructing includes washing out the image.

10. The method of claim 8 wherein the constructing includes adding an indication to the image that a data sharing session is paused.

11. The method according to claim 1, wherein the second set of data processing rules comprises instructions for constructing an image to be displayed on a display device associated with the local computing device, wherein the image is constructed from data comprising the first quantity of received data.

12. The method of claim 1 wherein the graphical object corresponds to a shared window.

13. The method of claim 1 wherein the first quantity of received data corresponds to less than the entirety of the graphical object when the graphical object is partially obscured.

14. A computer-readable storage medium storing computer-executable instructions that, when executed, perform a method of displaying shared data, the method comprising:

receiving at a local computing device shared data corresponding to a current state of a graphical object on a remote computing device;

analyzing the received shared data to determine whether the received shared data corresponds to an entirety of the graphical object; and when the received shared data is determined to correspond to less than the entirety of the graphical object, treating the received shared data according to a set of rules for constructing an image corresponding to a representation of the entirety of the graphical object using the received shared data, the received shared data containing a portion of the graphical object.

15. The computer-readable medium of claim 14 wherein the received shared data corresponds to less than the entirety of the graphical object when the graphical object is partially obscured on the remote computing device.

16. The computer-readable medium of claim 14 wherein the shared graphical object corresponds to contents of a shared window.

17. The computer-readable medium of claim 14 wherein the rules comprise instructions for employing a large portion of the received shared data and a small portion of previously received data corresponding to a portion of the shared graphical object for which data was not received.

18. The computer-readable medium of claim 17 wherein the large portion corresponds to approximately 70% of the shared graphical object.

19. A system for displaying shared data, comprising:

a remote computing device having a graphical object in a memory of the remote computing device that is to be shared; and a local computing device that receives shared data corresponding to the graphical object, and when the received shared data corresponds to less than an entirety of the graphical object, treats the received shared data according to a set of rules for constructing an image corresponding to a representation of the entirety of the graphical object using the received shared data, the received shared data containing a portion of the graphical object.

20. The computer-readable medium of claim 19 wherein the rules comprise instructions for employing a large portion of the received shared data and a small portion of previously received data corresponding to a portion of the shared graphical object for which data was not received, the large portion corresponding to approximately 70% of the graphical object.

* * * * *

UNITED STATES PATENT AND TRADEMARK OFFICE

CERTIFICATE OF CORRECTION

PATENT NO. : 7,595,798 B2
APPLICATION NO. : 11/187111
DATED : September 29, 2009
INVENTOR(S) : Ben-Shachar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 899 days.

Signed and Sealed this

Twenty-eighth Day of September, 2010

David J. Kappos

*Director of the United States Patent and Trademark Office*